March 24, 1953 T. A. HEWSON Re. 23,634

APPARATUS FOR PERFORMING CHEMICAL TESTS

Original Filed March 24, 1950 7 Sheets-Sheet 1

Inventor
Thomas A. Hewson
By Kenway, Jenney
Hitter & Hildreth
Attys.

March 24, 1953 T. A. HEWSON Re. 23,634

APPARATUS FOR PERFORMING CHEMICAL TESTS

Original Filed March 24, 1950 7 Sheets-Sheet 2

Inventor
Thomas A. Hewson
By Kenway, Jenney, Witter & Hildreth
Attys.

APPARATUS FOR PERFORMING CHEMICAL TESTS

Original Filed March 24, 1950 7 Sheets-Sheet 3

Inventor
Thomas A. Hewson
by Kenway, Jenney, Hitter & Hildreth
Attys.

APPARATUS FOR PERFORMING CHEMICAL TESTS

Original Filed March 24, 1950 7 Sheets-Sheet 4

Inventor
Thomas A. Hewson
by Kenway, Jenney, Witter & Hildreth
Attys.

APPARATUS FOR PERFORMING CHEMICAL TESTS

Original Filed March 24, 1950 7 Sheets-Sheet 5

Inventor
Thomas A. Hewson
by Kenway, Jenney, Witter & Hildreth
Attys.

March 24, 1953 T. A. HEWSON Re. 23,634

APPARATUS FOR PERFORMING CHEMICAL TESTS

Original Filed March 24, 1950 7 Sheets-Sheet 6

Inventor
Thomas A. Hewson
By Kenway, Jenney, Witter & Hildreth
Attys.

March 24, 1953 T. A. HEWSON Re. 23,634

APPARATUS FOR PERFORMING CHEMICAL TESTS

Original Filed March 24, 1950 7 Sheets-Sheet 7

Inventor
Thomas A. Hewson
by
Kenway, Jenney, Witter & Hildreth
Attys.

Reissued Mar. 24, 1953

Re. 23,634

UNITED STATES PATENT OFFICE 23,634

APPARATUS FOR PERFORMING CHEMICAL TESTS

Thomas A. Hewson, Medfield, Mass., assignor to Lessells and Associates, Inc., Boston, Mass., a corporation of Massachusetts Original No. 2,550,067, dated April 24, 1951, Serial No. 151,763, March 24, 1950. Application for reissue April 23, 1952, Serial No. 283,835

9 Claims. (Cl. 23—253)

Figure 1:
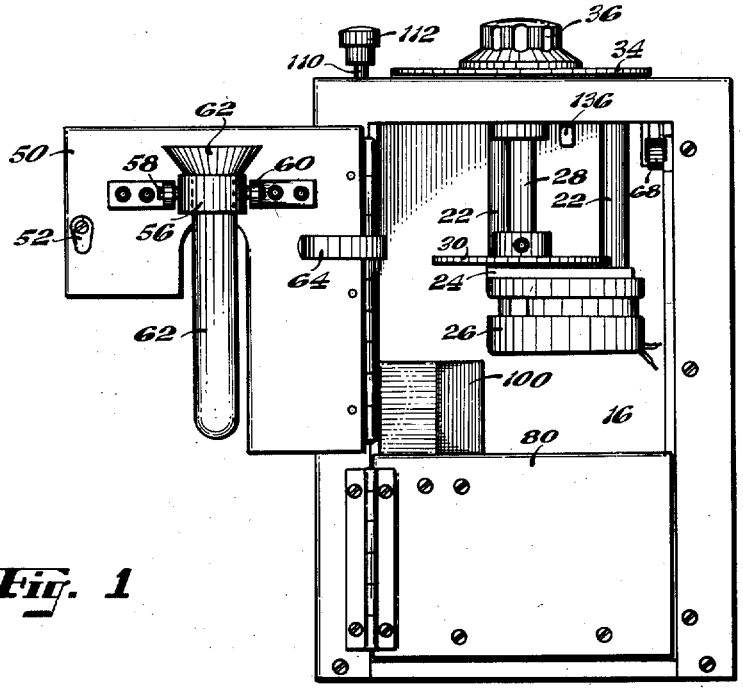

Matter enclosed in heavy brackets [ ] appears in the original patent but forms no part of this reissue specification; matter printed in italics indicates the additions made by reissue.

My invention relates to laboratory apparatus with which a variety of chemical processes or tests may be carried out automatically.

As the science of medicine progresses physicians have come more and more to use and rely upon various tests upon body fluids as an aid in the accurate diagnosis of various diseases and conditions such, or example, as diabetes, venereal diseases, and the like. It has been customary for physicians to take a sample of the fluid to be tested during a consultation and then at some later time have the necessary tests made. This procedure is time consuming and tends to increase the number of consultations required. The number of mechanical steps required to complete a test is ordinarily so great as to preclude having the work done during a consultation, because of the time required to assemble the equipment and carry out the steps of the process.

The primary object of my invention is to provide a simple machine which will automatically perform a desired chemical test within a few minutes, thus rendering it possible for a physician to take a sample of the body fluid to be tested early in a consultation with his patient, start the machine, and receive the results prior to the end of the consultation.

Another object of the invention is to eliminate the necessity for the services of a skilled technician in the performance of clinical tests.

Still another object of the invention is to improve the accuracy and efficiency with which such tests are carried out.

An important feature of my invention consists in a casing provided with a test tube receiver, a heater and a fluid container disposed below the receiver and mounted for joint movement, a tablet dispenser disposed above the receiver, and control mechanism for automatically operating the dispenser and the mount for the heater and fluid container in timed relation so that reagent tablets may be dropped into the test tube at properly timed intervals while the contents of the test tube are being alternately heated by the heater and cooled by immersion in the fluid container, all being carried out automatically to perform predetermined process operations in the meantime.

Another feature of the invention resides in a cam disposed in position to engage a test tube in the receiver and rotated by the control mechanism in properly timed relation to vary the angle of inclination of the test tube not only to control the amount of heat supplied to it, but also for the purpose of permitting the disposition of a buoyant precipitate within the bell mouth of the test tube.

Another feature of the invention resides in mechanism effective to withdraw the heater from operating position and simultaneously move the fluid container beneath the receiver in such position that the test tube is immersed in the fluid.

Figure 2:
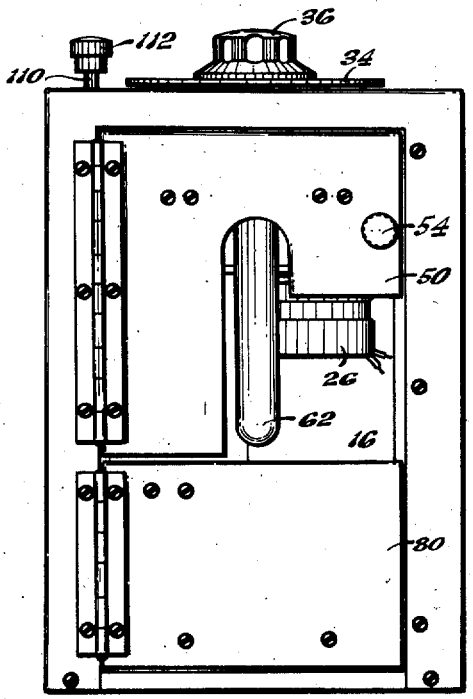
Figure 3:
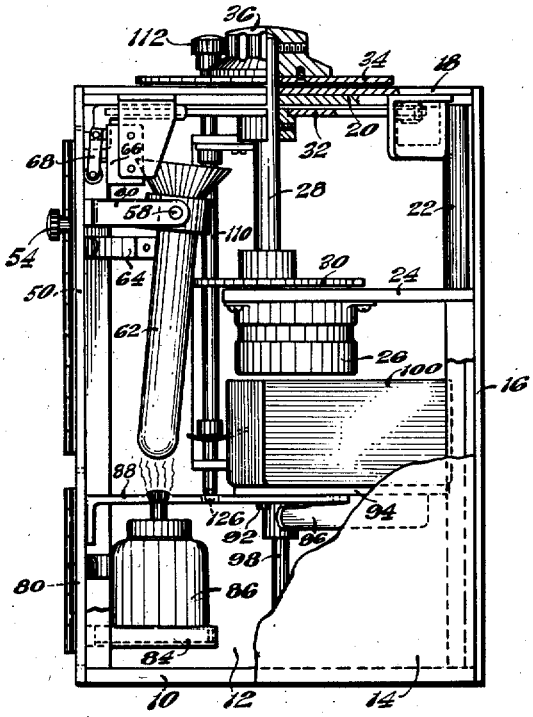
Figure 4:
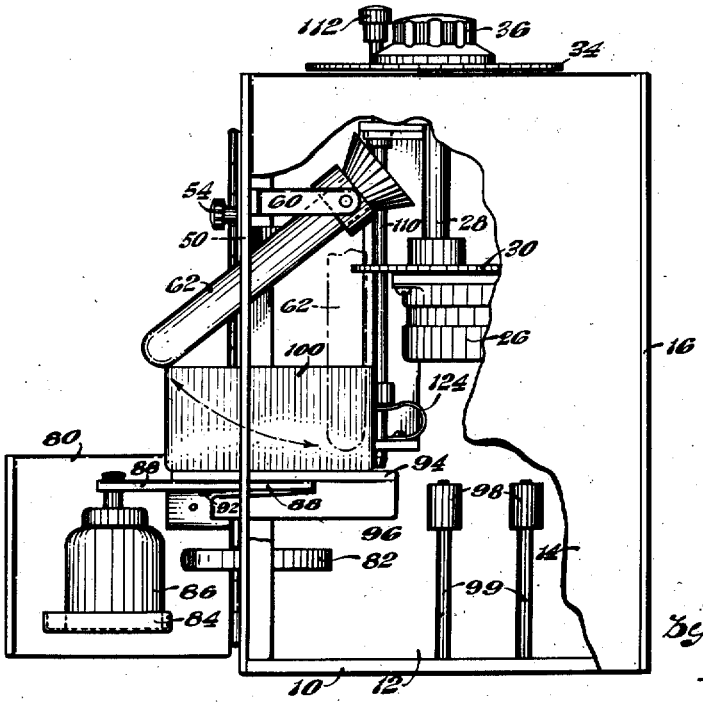
Figure 13:
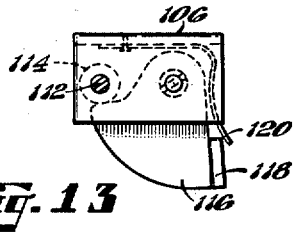

Other objects and features of my invention will be more readily understood and appreciated from the following detailed description of a preferred embodiment thereof selected for purposes of illustration and shown in the accompanying drawings in which:

Fig. 1 is a view in front elevation showing the apparatus with the upper door open and the lower door closed, Fig. 2 is a view in front elevation showing the device with both doors in closed position, Fig. 3 is a view in side elevation with portions of the wall being broken away to expose the contents and with some elements shown in section, both doors being closed, Fig. 4 is a view in side elevation with portions of the side wall being broken away to expose the contents, the upper door being closed and the lower door being opened, Figs. 5–12 are plan views showing the position of the elements of the mechanism as the machine progresses through its cycle, Fig. 13 is a plan view of a portion of the latching mechanism for the lower door.

Figure 7:
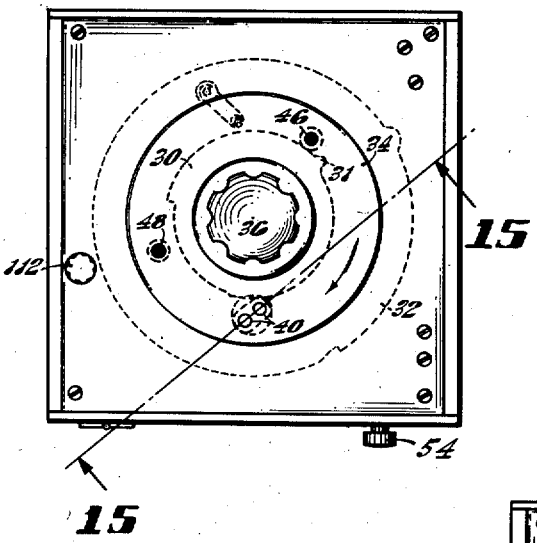
Figure 8:
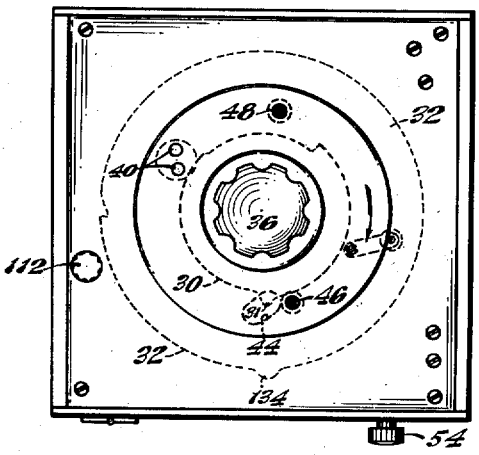
Figure 9:
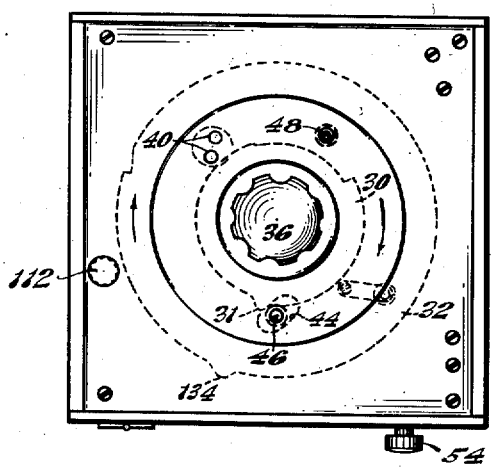
Figure 14:
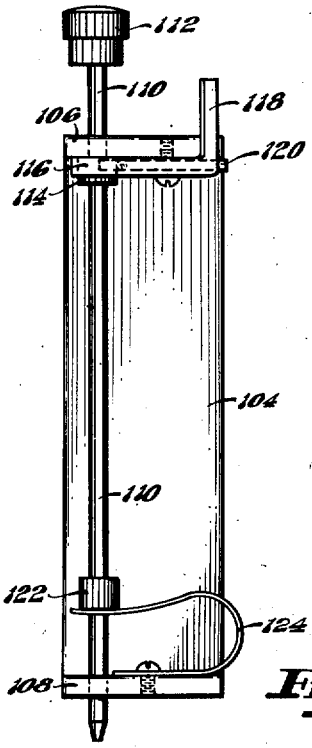
Figure 15:
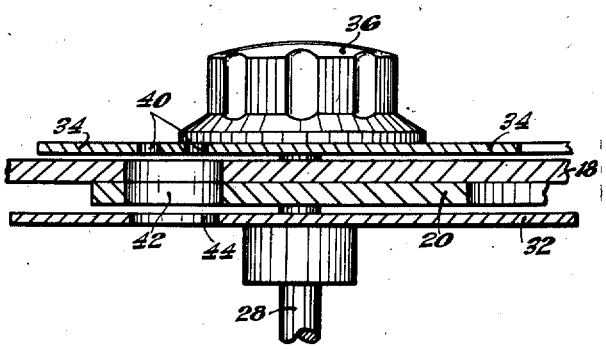
Figure 16:
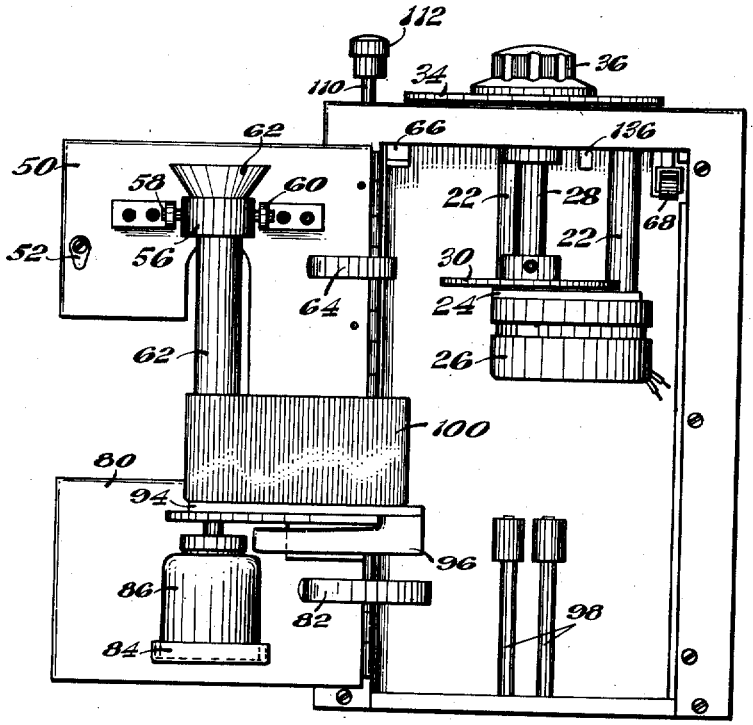

Fig. 14 is a view in side elevation of the latching mechanism for the lower door, Fig. 15 is a view in cross section along the line 15—15 of Fig. 7, and Fig. 16 is a view in front elevation with both doors in open position.

The general organization of the apparatus best appears in Figs. 1–4 and 16 wherein the elements are shown as assembled in and upon a rectangular box-like casing having a flat base or bottom wall 10, a solid side wall 12 and 14, a solid rear wall 16, and a flat top 18. The casing is preferably constructed of sheet metal of suitably heavy gauge and adequately braced to form a stout, rigid enclosure. Suspended from the top 18 is a motor bracket including a rectangular upper plate 20, a similar bottom plate 24 and two vertical supporting posts 22. A small slow speed electric motor 26 is secured to the bottom of the lower plate 24 and is arranged to drive a vertical shaft 28 which extends upwardly through the top 18 of the casing. Adjacent the upper surface of the motor bracket plate 24 a flat cam plate 30 is fixed to the shaft 28 while a similar but larger plate 32 is secured to the shaft 28 adjacent the lower surface of the upper motor bracket plate 20. A flat metal disk 34 is secured to the shaft 28 adjacent the upper surface of the top 18 and is secured to a relatively large knob 36 by means of which the shaft 28 with the plates 30, 32 and 34 may be adjusted to any desired angular position.

Figure 6:
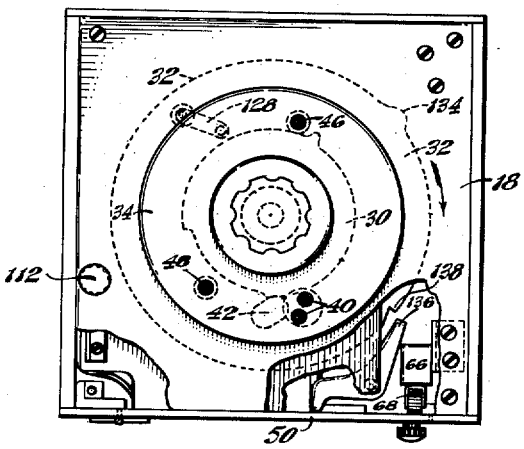

The plate 34 is utilized as a magazine for the dispensing of reagent tablets and to this end, as shown for example in Fig. 6, is provided with a pair of closely adjacent holes 40 in which a pair of small tablets may be placed. Another hole 46 is spaced angularly from the holes 40 and utilized for a third reagent tablet, while still another hole 48 spaced from the hole 46 is utilized for a fourth reagent tablet. These tablet holes are spaced from the center of the disk 34 by equal amounts. The top 18 of the casing and the motor bracket plate 20 are bored to provide a passage 42 which lies in the path of the holes in the plate 34. Also the plate 32 is provided with holes aligned vertically with the holes in the dispensing plate 34. It will now be evident that if tablets are placed in the holes 40, 46 and 48, they will be swept along the surface of the top 18 until the respective holes come sequentially in alignment with the passage 42, at which time the tablets drop into the plate 32.

The front of the casing is provided with a pair of doors of which the upper one 50 is provided with a latch 52 operated by a knob 54 on the exterior thereof. A metal ring or test tube receiver 56 is pivotally mounted by a pair of pins 58 upon a pair of lugs 60 secured to the inner surface of the door 50. A bell mouth test tube 62 is shown held in the receiver ring 56, the door 50 being slotted or cut away to permit the test tube to be tilted to any desired degree of inclination. The lower free corner of the door 50 is also cut away for a purpose later to be discussed. A leaf spring 64 serves to urge the door 50 into full open position as shown in Fig. 1 so that the door swings open automatically when the knob 54 is manipulated to free the latch 52. A microswitch 66 is mounted within the casing and provided with a roller arm 68 disposed in position to be actuated by the inner surface of the door 50 when the latter is moved into closed position. The microswitch 66 controls the circuit to the motor 26, so that the closing of the door 50 serves to start the cycle of the machine, as will later be more fully explained. Hinged to the casing is a lower door 80 upon which bears a leaf spring 82 serving to urge the door 80 into full open position. Adjacent the bottom of the door 80 is secured a bracket 84 in which is mounted a small alcohol lamp 86, the bracket and lamp being so disposed that when both doors are closed, the wick of the lamp 86 is poised directly beneath the lower end of the test tube 62.

Also secured to the inner surface of the door 80 is a shelf 88 carrying on its upper surface a stop 90 which serves to limit the extent of outward movement of the door by bearing against the lower edge of the upper door 50. A horizontal plate 94 is pivotally mounted on the shelf 88 upon a pivot pin 92 and has secured to its lower surface a vertical rib or finger 96 disposed in position to encounter a pair of rollers 98 mounted on a pair of vertical posts 99 secured to the base 10 of the casing and positioned in such fashion that if the door 80 is closed, the rib 96 encounters the first roller 98 and initiates a rotation of the plate 94. Then the finger 96 encounters the second roller 98 and further deflects the plate 94. An elongated rectangular fluid container 100 is disposed on the upper surface of the plate 94 and bears at one side upon the edge of the stop 90.

Upon the opposite side of the container 100 there is a leaf spring 102 which serves to clamp the container 100 in position upon the plate 94. In the closed position of the door 80 the fluid container is swung on the plate 94 to occupy a position in the rear left hand corner of the casing as viewed from the front end as shown in Figs. 1 and 3. On the other hand when the door 80 is opened, the container 100 swings to the right and outwardly until it reaches the position shown in Figs. 11 and 12. The rib 96 is held against the rollers 98 by the force exerted by the spring 102. Overthrow of the container, plate and rib is prevented by the stop 90.

I provide means for holding the door 80 latched in closed position for a predetermined period in the cycle of the machine, after which the latch is released and the lower door opened. This mechanism is best shown in Figs. 3, 4, 13 and 14 wherein it will appear that a long vertical bracket 104 is secured to the side wall 12 of the casing and is provided with an upper horizontal plate 106 and a corresponding lower horizontal plate 108, both plates being pierced to afford passage for a long vertical shaft 110 capped at the top by a knob 112. Adjacent the lower surface of the plate 106 there is a collar 114 secured to the shaft 110 and cooperating with a lever 116 urged against the collar by a leaf spring 120, so that when the knob 112 is depressed, the lever 116 slides over the top of the collar 114. The lever 116 has an integral, vertical actuating arm 118 which is disposed in the path of an arm 128 carried on the rotating plate 32. A leaf spring 124 is secured to the bottom plate 108 and bent to underlie a collar 122 secured to the shaft 110, the result being that the spring 124 urges the shaft 110 upwardly. Thus, when the knob 112 is depressed, the lever 116 slides in over the collar 114 to hold the shaft latched down against the action of the spring. When the arm 128 encounters the arm 118, the lever 116 is moved away from the collar 114 so that the shaft 110 may be returned by the spring 124 to elevated position. The lower end of the shaft 110 projects through the plate 108 and is tapered at its point so that it may more easily enter a hole 126 bored in the shelf 88 on the door 80. A second microswitch 130 is provided with a roller arm 132 and secured to the top 18 of the casing in such position that the roller arm 132 is disposed in the path of a projection 134 of the plate 32. The microswitch 130 is included in the circuit to the motor 26, is connected in series with the microswitch 66, and serves to open the circuit to the motor and put an end to the cycle of the machine.

The actuation of the arm 132 by the projection 134 stops all motion of the apparatus leaving the microswitch 130 opened, thus cutting off the supply of current to the motor 26. In order to set the machine for another cycle of operation it is merely necessary to grasp the knob 36 and rotate it in clockwise direction a slight amount until a notch 138 in the rim of the plate 32 encounters the inner end of a bell crank lever 136 pivotally mounted on the lower surface of the top 18. This movement permits the arm 132 to close the microswitch 130. If now the door 50 is in open condition, the microswitch 66 is opened so that no current is yet supplied to the motor 26. The other end of the bell crank lever 136 is so positioned that it encounters the closing door 50, the result being that the lever is free from engagement with the plate 32 at the same time the arm 68 operates to close the microswitch 66 and restart the motor 26.

Figure 5:
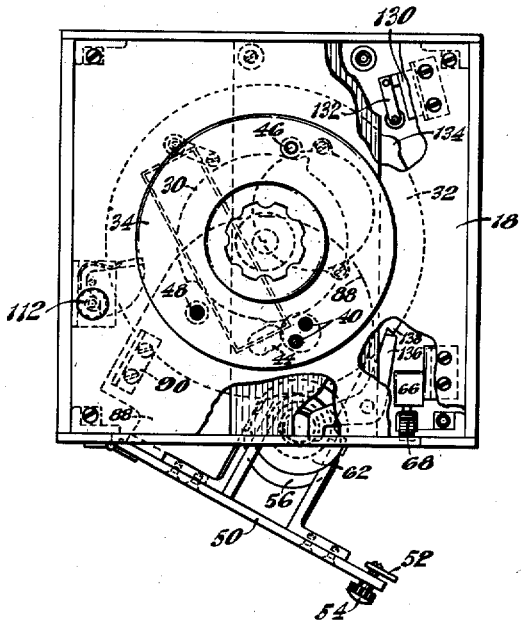

Having described the elements of the apparatus I will now proceed to describe a complete cycle of its operation. We shall assume that the apparatus is in the condition shown in Fig. 16 in which both doors are open. The first step is to light the alcohol lamp 86 and place water or other cooling fluid in the container 100. Then the lower door 80 is shut and the knob 112 depressed to hold the door shut. Then the test tube with the fluid to be tested is inserted in the receiver ring 56. The next step is to turn the knob 36 clockwise so that the microswitch 130 is permitted to close and the catch 136 is engaged in the knob 138. The engagement of the catch will be signalled by a click, serving as a signal that the apparatus is ready to work. The door 50 is then closed and in doing so the catch 136 is free from engagement with the notch in the plate 132 and the arm 68 actuated to close the microswitch 66 and supply current to the motor 26. Of course, closing the door 50 also serves to suspend the test tube 62 over the flame of the lamp 86. In Fig. 5 the elements are shown as they appear after the knob 36 has been turned to cause engagement of the catch 136 and the closing of the microswitch 130. In Fig. 6 the upper door 50 is shown as closed, the catch 136 disengaged, and the arm 68 in closed position.

In Fig. 7 the plates 32 and 34 are shown as having travelled in clockwise direction to the point where the twin holes 40 are in vertical alignment with the passage 42 in the top 18 and motor bracket plate 20. At this point the first two reagent tablets drop into the test tube 62. Also the test tube 62 is engaged by the surface of the cam plate 30 as shown in Fig. 3 and by it maintained in slightly inclined position. The heating of the contents of the test tube then proceeds with the conditions unchanged until the plates 32, 34 and 30 reach the position shown in Fig. 8 whereupon a projection 31 on the cam plate 30 operates to tilt the test tube 62 outwardly allowing a buoyant precipitate to decant into the bell mouth portion of the test tube. It will be seen in Fig. 8 that the third tablet in the hole 46 has approached almost to the passage 44, and in Fig. 9 the elements have reached the point where the third tablet drops into the test tube. Furthermore the cam plate 30 has a relatively long arcuate projection effective to incline the test tube 62 further from the vertical with the result that the contents of the tube are given less heat since the tube has been inclined a further distance away from the flame.

Figure 10:
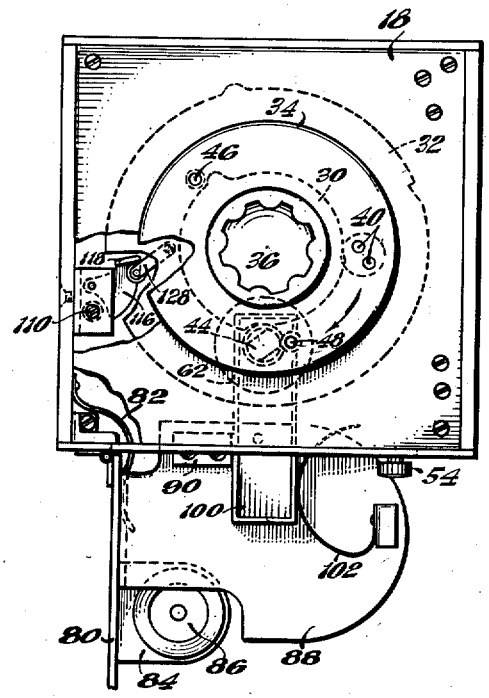
Figure 11:
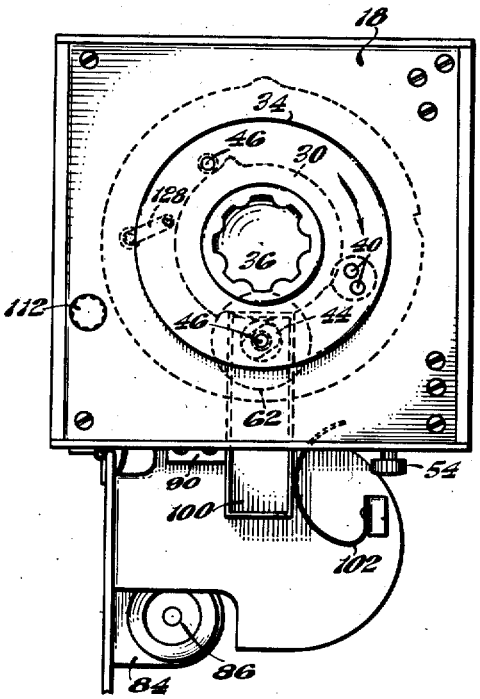
Figure 12:
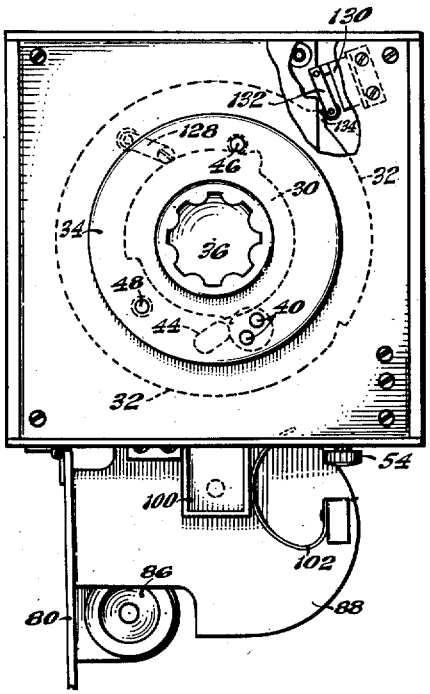

The next stage of the cycle is shown in Fig. 10 wherein the arm 128 on the plate 132 has encountered the actuating arm 118 on the lever 116, tripped it, and permitted the spring 124 to elevate the shaft 110 and free the lower door 80 so that the leaf spring 82 will move it to open position. This takes the lamp 86 completely away from the test tube 62 and causes the fluid container 100 to move outwardly. In its movement the fluid container 100 engages the test tube 62 and tilts it upwardly until the end of the tubes slides over the outwardly moving end of the container and then rides over the edge and drops into the interior of the container. This action is shown best in Fig. 4. It will be observed also that at this point the cam 30 has a reduced diameter so that the test tube 60 is in approximately vertical position, immersed in the cooling bath. At this point the hole 48 in the plate 34 containing a fourth reagent tablet has approached nearly to the passage 44, and in Fig. 11 the elements are shown at the moment when the fourth tablet is dropped into the test tube 62. The plates continue to rotate without affecting the test tube 62 until the elements reach the positions shown in Fig. 12 where the projection 134 encounters the roller arm 132 of the microswitch 130 and actuates it to open the switch to the motor.

The cycle is now complete and all the elements of the apparatus are at rest, the current being turned off. It remains only to open the door 50 so that the elements are in the position shown in Fig. 16; then the test tube 62 may be removed from the receiver and inspected.

It should be noted that the cycle of operations described above was designed to permit automatic performance of the Wilkerson-Heftmann test for a sugar content of human blood, a test of considerable importance in connection with the diagnosis of diabetes. The character of the test performed of course depends to a large extent on the chemical nature of the reagent tablets. It will be observed that the apparatus herein shown and described can be utilized for the performance of any test requiring a heating operation followed by a cooling operation together with the addition of reagent tablets of any character at timed intervals. However, my invention is by no means limited to apparatus of the specific character shown but may easily be applied to the automatic performance of a wide variety of procedures. I contemplate that the dispenser plate 34, and the two cam plates 30 and 32 shall be replaced with others designed to dispense any given number of tablets at desired time intervals, to effect any desired succession of inclination of the test tube in order to control the heating of its contents and any desired timing for the change from the heater to the cooling bath. The shelf in the lower door 80 may obviously be replaced with a rotating turret containing heaters, cooling baths and the like in any desired succession and arrangement. Moreover the cam 30 may be designed with a multiplicity or projections in order to effect agitation and shaking of the test tube and its contents. Alternatively I may provide an opposed pair of electrical heaters between which the test tube may be moved as desired in the cycle of the machine.

While the apparatus herein shown and described is particularly suited for use by individual physicians, I also contemplate that it can be conveniently used in hospitals and laboratories for the performance of a variety of test procedures. For example, a laboratory may be equipped with several units in a bank, thereby permitting one technician to run a number of different tests practically simultaneously.

Having thus disclosed my invention, what I claim as new and desire to secure by Letters Patent of the United States is:

1. Apparatus of the class described, comprising a casing, an upper door hinged to said casing, a receptacle-receiver pivotally mounted on said door, means mounted within the casing for engaging a receptacle in said receiver and for tilting it through a succession of predetermined angles, a lower door hinged to said casing beneath said upper door, a heater secured to said lower door in position to underlie the receiver when both doors are in closed position, and a fluid container secured to said lower door in position to underlie said receiver when the upper door is closed and the lower door is opened.

2. Apparatus of the class described, comprising a casing, an upper door hinged to said casing, a receptacle-receiver pivotally mounted on said door, means mounted within the casing for engaging a receptacle in said receiver and for tilting it through a succession of predetermined angles, means associated with said tilting means for depositing tablets into said receptacle, a lower door hinged to said casing beneath said upper door, a heater secured to said lower door in position to underlie the receiver when both doors are in closed position, and a fluid container secured to said lower door in position to underlie said receiver when the upper door is closed and the lower door is opened.

3. Apparatus of the class described, comprising a casing, an upper door hinged to said casing, a receptacle-receiver pivotally mounted on said door, means mounted within the casing for engaging a receptacle in said receiver and for tilting it through a succession of predetermined angles, a lower door hinged to said casing beneath said upper door, a heater secured to said lower door in position to underlie the receiver when both doors are in closed position, a fluid container secured to said lower door in position to underlie said receiver when the upper door is closed and the lower door is opened, a spring urging said door to open position, and a trip latch serving to retain said lower door in closed position.

4. Apparatus of the class described, comprising a casing, a receptacle receiver pivotally suspended in the casing, a heater, a fluid container, means mounting said heater and container for joint movement beneath said receiver, a tablet dispenser disposed above said receiver, and control mechanism for operating said dispenser and said mounting means in timed relation.

5. Apparatus of the class described, comprising a casing, a receptacle-receiver pivotally suspended in the casing, a cam rotatably mounted in position to engage a receptacle in the casing and govern its inclination, a plate rotatably mounted on the top of the casing and having a hole disposed in position to overlie said receiver in its path of movement, the top of the casing having a hole overlying said receiver, and means driving said cam and plate in timed relation.

6. Apparatus of the class described, comprising a casing, an upper door hinged to said casing, a receptacle-receiver pivotally mounted on the inner surface of the door, a lower door hinged to said casing, a heater mounted on the inner surface of said lower door, a bracket secured to said lower door, a fluid container disposed on said bracket and displaced inwardly from said heater, whereby when both doors are closed the heater underlies the receiver whereas the container underlies the receiver when the lower door is opened.

7. Apparatus of the class described, comprising a casing, a door hinged to said casing, a receptacle-receiver pivotally mounted on the inner surface of said door, a receptacle-heater mounted within said casing in position to underlie said receiver when the door is closed, a tablet dispenser mounted on said casing in position to overlie said receiver when said door is closed, and control mechanism for said dispenser and heater, said control mechanism being mechanically coupled to said door.

8. Apparatus of the type defined in claim 7 wherein a fluid container is disposed in said casing, and door actuated means for transferring a receptacle from said heater to said fluid container.

*9. Apparatus of the class described, comprising a casing, a receptacle receiver pivotally suspended within the casing, a heater and a fluid container both located within the casing, means mounting said heater and container for relative movement with respect to said receiver, said heater and container being disposed beneath said receiver, a tablet dispenser arranged for dispensing movement above said receiver, and control means for operating said dispenser and said mounting means in timed relation.*

THOMAS A. HEWSON.

No references cited.